E. R. DRAKE.
PLANT PROTECTOR.
APPLICATION FILED MAY 29, 1913.
1,077,057.
Patented Oct. 28, 1913.
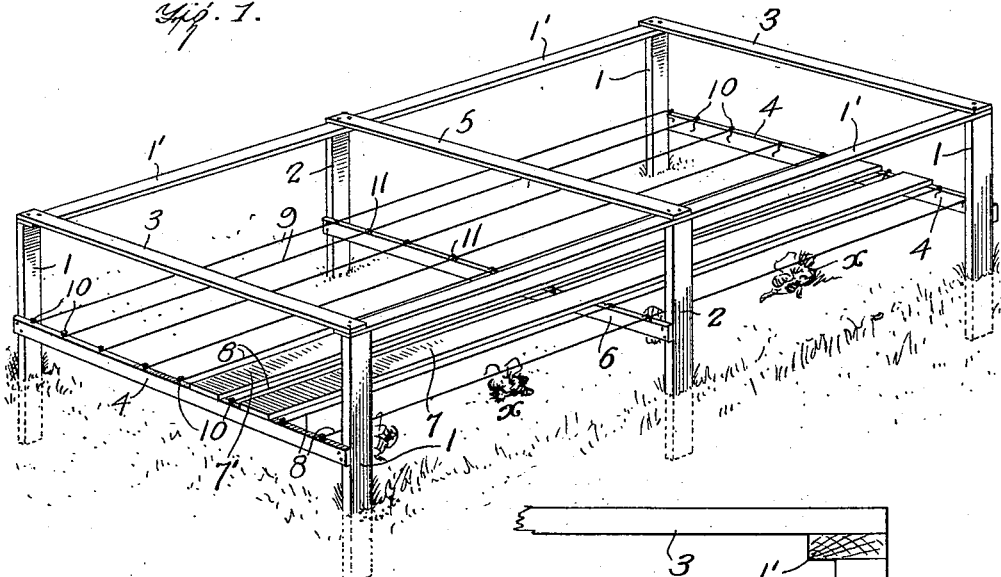
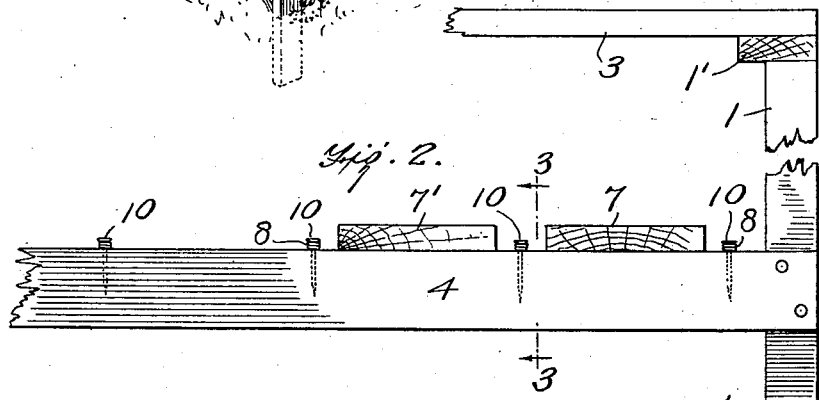
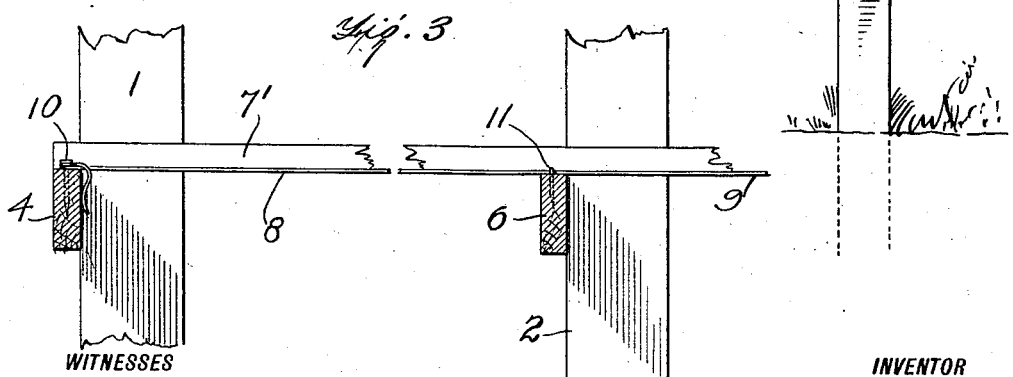
WITNESSES
INVENTOR
EDWIN R. DRAKE,
BY
ATTORNEYS

UNITED STATES PATENT OFFICE.

EDWIN R. DRAKE, OF DE LAND, FLORIDA.

PLANT-PROTECTOR.

1,077,057.

Specification of Letters Patent. Patented Oct. 28, 1913.

Application filed May 29, 1913. Serial No. 770,649.

*To all whom it may concern:*

Be it known that I, EDWIN R. DRAKE, a citizen of the United States, and a resident of De Land, in the county of Volusia and State of Florida, have invented an Improvement in Plant-Protectors, of which the following is a specification.

My present invention is an improvement upon the one for which I have received Letters Patent No. 932,972, issued August 31, 1909, the same being particularly adapted for use in the cultivation of tomatoes, egg plants, peppers, and various other vegetables.

The construction and arrangement of parts embodying the invention are as hereinafter described, and illustrated in the accompanying drawing, in which—

Figure 1 is a perspective view of the protector. Fig. 2 is an end view of a portion of the same. Fig. 3 is a vertical section on the line 3—3 of Fig. 2.

I erect a skeleton frame which is rectangular and oblong, as shown in Fig. 1, the same being so arranged that it ranges east and west, the longer sides being thus north and south. The frame comprises six vertical posts indicated by numerals 1 and 2, there being three posts on each of the longer sides. Opposite end posts 1 and 1 are connected by upper and lower cross-bars 3 and 4, and the middle posts 2 are similarly connected by upper and lower cross-bars 5 and 6. The posts on each side are connected at the top by bars 1'. The lower cross-bars 4, 4, and 6 are located about twelve inches from the ground, and the several posts 1 and 2 are extended upward a considerable distance. Boards or planks 7 and 7' are laid parallel and supported on the three cross-bars 4 and 6, along the south side of the frame and adjacent to a row of plants $x$. The first board or plank is placed three inches from the plants, and the second is four inches. Thus, a desired measure of protection is furnished for the plants where the rays of the sun are hottest, and, later, another board or plank (not shown) is laid on the cross-bars 4 and 6 and spaced four inches from the second plank 7'. No. 20 wires 8 are stretched parallel to each other from one end cross-bar 4 to the other one, passing intermediately over the central cross-bar 6. These wires are spaced eight inches apart over a row of plants and between the boards or planks 7 and 7', their function being to support the plants. Other wires, 9, are subsequently stretched parallel to the first ones and placed nine inches apart. All the wires are attached, that is to say, coiled about, nails 10 which are driven into the end cross-bars 4. The wires are secured to the middle cross-bar 6 by means of staples 11.

In practical construction of the protector, I preferably employ boards or planks which are 1"x6"x12', and the upper and lower cross-bars are preferably 1"x3". The posts 1 and 2 may also be made of very light material.

It will be understood that the object of using the boards 7 and 7' on the south side of the frame is to blend the rays of the sun from the time the plants are set out, that is to say, to prevent the rays striking the plants with full force; and the object in using the wires, as before intimated, is to hold up the plants or vines and keep the same off the ground.

The top portion of the framework, comprising the longitudinal bars 1' and cross bars 3 and 5, serve, when occasion requires, for supporting burlap or other coarse fabric or planks, which may be used for protecting the plants, in addition to the protection afforded by the boards or planks supported on the cross-bars 4 and 6.

I claim:—

The improved plant-protector, comprising a skeleton frame including a series of posts arranged as described and end and intermediate cross-bars attached to said posts and located a short distance above the ground, parallel wires secured to and stretched between the end cross-bars and over the intermediate one and spaced apart to adapt them for supporting plants, and a series of planks resting on the three cross-bars and made of considerably less width than the space between the wires, as described.

EDWIN R. DRAKE.

Witnesses:
T. E. ARNOLD,
E. B. WILLCOXAN.

Copies of this patent may be obtained for five cents each, by addressing the "Commissioner of Patents, Washington, D. C."